United States Patent
Kruglick (10) Patent No.: US 9,760,390 B2
(45) Date of Patent: Sep. 12, 2017

(54) PROCESSOR IDENTIFICATION FOR VIRTUAL MACHINES

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 580 days.

(21) Appl. No.: 14/351,070

(22) PCT Filed: Jul. 16, 2013

(86) PCT No.: PCT/US2013/050723
§ 371 (c)(1),
(2) Date: Apr. 10, 2014

(87) PCT Pub. No.: WO2015/009288
PCT Pub. Date: Jan. 22, 2015

(65) Prior Publication Data
US 2016/0210164 A1    Jul. 21, 2016

(51) Int. Cl.
*G06F 9/455*    (2006.01)
(52) U.S. Cl.
CPC ...... *G06F 9/45558* (2013.01); *G06F 9/45533* (2013.01); *G06F 2009/4557* (2013.01)
(58) Field of Classification Search
USPC .......................................................... 718/1
See application file for complete search history.

(56) References Cited

U.S. PATENT DOCUMENTS 8,127,296 B2    2/2012  Khatri et al.
8,522,305 B2 *  8/2013  Cho ..................... G06F 21/41
                                                     726/1

(Continued)

OTHER PUBLICATIONS

"Amazon EC2 Instances," accessed at web.archive.org/web/20130709065046/http://aws.amazon.com/ec2/instance-types/, accessed on Mar. 31, 2014, pp. 1-5.

(Continued)

*Primary Examiner* — Meng An
*Assistant Examiner* — Willy W Huaracha
(74) *Attorney, Agent, or Firm* — Moritt Hock & Hamroff LLP; Steven S. Rubin, Esq.

(57) ABSTRACT

Technologies are generally described for systems, devices and methods effective to execute virtual machines on a core. In some examples, a processor may execute a first virtual machine on the core and receive a first request for an identification of the core by the first virtual machine. The processor may generate a first identifier associated with the core and associate the first identifier with the first virtual machine. The processor may report the first identifier to the first virtual machine. The processor may further execute a second virtual machine on the core and receive a second request for an identification of the core by the second virtual machine. The processor may generate a second identifier associated with the core that may be different from the first identifier. The processor may associate the second identifier with the second virtual machine and report the second identifier to the second virtual machine.

19 Claims, 6 Drawing Sheets

(56) References Cited

U.S. PATENT DOCUMENTS

| | | | |
|---|---|---|---|
| 9,304,886 B2* | 4/2016 | Allen-Ware | G06F 1/3206 |
| 2003/0097602 A1 | 5/2003 | Bigbee et al. | |
| 2008/0104586 A1* | 5/2008 | Thorton | G06F 9/45533 |
| | | | 718/1 |
| 2009/0070760 A1 | 3/2009 | Khatri et al. | |
| 2009/0193297 A1 | 7/2009 | Williams et al. | |
| 2010/0077394 A1 | 3/2010 | Wang et al. | |
| 2010/0138828 A1 | 6/2010 | Hanquez et al. | |
| 2011/0320825 A1* | 12/2011 | Greiner | G06F 9/30003 |
| | | | 713/190 |
| 2012/0084777 A1 | 4/2012 | Jayamohan | |
| 2013/0081016 A1 | 3/2013 | Saito et al. | |
| 2015/0256343 A1* | 9/2015 | Graveman | G06F 21/30 |
| | | | 713/183 |

OTHER PUBLICATIONS

"Getting CPU ID on virtual machine," accessed at web.archive.org/web/20130521004418/http://stackoverflow.com/questions/5109261/getting-cpu-id-on-virtual-machine, accessed on Mar. 31, 2014, pp. 1-2.

"LEMON—Money Trees (Rap Genius Response to Heroku)," accessed at web.archive.org/web/20130606055222/http://news.rapgenius.com/Lemon-money-trees-rap-genius-response-to-heroku-lyrics, accessed on Mar. 31, 2014, pp. 1-5.

"Online GUID Generator," accessed at web.archive.org/web/20130704152003/http://www.guidgenerator.com/online-guid-generator.aspx, accessed on Mar. 31, 2014, p. 1-1.

"White Paper: Ensuring the success of data center consolidation," Fluke Networks, pp. 1-11, Fluke Corporation (2013).

Agesen, O., et al., "Software Techniques for Avoiding Hardware Virtualization Exits," Technical Report VMware, pp. 13 (2011).

Kansal, A., et al., "Virtual Machine Power Metering and Provisioning," Proceedings of the 1st ACM symposium on Cloud computing, ACM, pp. 39-50 (2010).

Le, K., et al., "Cost-Aware Virtual Machine Placement in Cloud Computing Systems" Technical Report DCS-TR-680, Dept. of Computer Science, Rutgers University, pp. 13, (2010).

Mi, H., et al., "Performance Problems Diagnosis in Cloud Computing Systems by Mining Request Trace Logs," IEEE Network Operations and Management Symposium (NOMS), pp. 893-899 (2012).

Myers, M., and Youndt, S., "An Introduction to Hardware-Assisted Virtual Machine (HVM) Rootkits," White Paper of Crucial Security, pp. 1-15 (2007).

Ristenpart, T., et. al., "Hey, You, Get Off of My Cloud: Exploring Information Leakage in Third-party Compute Clouds," Proceedings of the 16th ACM Conference on Computer and Communications Security, pp. 199-212 (2009).

Staley, A., "When EC2 Hardware Changes Underneath You . . . ," accessed at web.archive.org/web/20130430102205/http://blog.picloud.com/2013/01/08/when-ec2-hardware-changes-underneath-you/, Jan. 8, 2013, pp. 1-4.

Wyatt, P., "Whose bug is this anyway?!?," accessed at web.archive.org/web/20130709121649/http://codeofhonor.com/blog/whose-bug-is-this-anyway, Dec. 18, 2012, pp. 1-8.

Zhang, Y., et al., "Cross-VM Side Channels and Their Use to Extract Private Keys," Proceedings of the 2012 ACM conference on Computer and communications security, ACM, pp. 305-316 (2012).

International Search Report with Written Opinion for International Application No. PCT/US2013/050723 mailed on Feb. 7, 2014, pp. 18.

* cited by examiner

PROCESSOR IDENTIFICATION FOR VIRTUAL MACHINES

CROSS REFERENCE TO RELATED APPLICATIONS APPLICATION

This application is a U.S. National Stage filing under 35 U.S.C. §371 of International Application No. PCT/US13/50723 filed Jul. 16, 2013. The disclosure of the International Application is hereby incorporated by reference in its entirety.

BACKGROUND

Unless otherwise indicated herein, the materials described in this section are not prior art to the claims in this application and are not admitted to be prior art by inclusion in this section.

A processor may execute one or more virtual machines. A virtual machine may be a software instantiation of a computing environment or operating system. Virtual machines may emulate the architecture and/or the functions of a physical machine. Two or more virtual machines may be executed by a single processor or core.

SUMMARY

In some examples, methods for executing virtual machines on a core are generally described. The methods may include executing a first virtual machine on the core. The methods may include receiving a first request for an identification of the core by the first virtual machine. The methods may include generating a first identifier associated with the core. The methods may include associating the first identifier with the first virtual machine. The methods may include reporting the first identifier to the first virtual machine in response to the first request. The methods may further include executing a second virtual machine on the core. The methods may include receiving a second request for an identification of the core by the second virtual machine. The methods may include generating a second identifier associated with the core, the second identifier being different from the first identifier. The methods may include associating the second identifier with the second virtual machine. The methods may include reporting the second identifier to the second virtual machine in response to the second request.

In some examples, systems configured to execute virtual machines on a core are generally described. The systems may include a memory that includes instructions and a processor configured to be in communication with the memory. The processor may be configured to, in accordance with the instructions, execute a first virtual machine on the core. The processor may be configured to receive a first request for an identification of the core by the first virtual machine. The processor may be configured to generate a first identifier associated with the core. The processor may be configured to associate the first identifier with the first virtual machine. The processor may be further configured to report the first identifier to the first virtual machine in response to the first request. The processor may be configured to execute a second virtual machine on the core. The processor may be configured to receive a second request for an identification of the core by the second virtual machine. The processor may be configured to generate a second identifier associated with the core. The second identifier may be different from the first identifier. The processor may be configured to associate the second identifier with the second virtual machine. The processor may be configured to report the second identifier to the second virtual machine in response to the second request.

In some examples, methods for executing a virtual machine on a core are generally described. The methods may include requesting that a virtual machine be executed by the core. The methods may include sending a first request for an identification of the core by the virtual machine The methods may include receiving a first identifier associated with the core. The methods may include sending a second request for an identification of the core by the virtual machine. The methods may include receiving a second identifier associated with the core. The second identifier may be different from the first identifier.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations, all of which are explicitly contemplated herein.

This disclosure is generally drawn to, inter alia, technologies including methods, apparatus, systems, devices, and computer program products related to processor identification for virtual machines.

Briefly stated, technologies are generally described for systems, devices and methods effective to execute virtual machines on a core. In some examples, a processor may execute a first virtual machine on the core and receive a first request for an identification of the core by the first virtual machine. The processor may generate a first identifier associated with the core and associate the first identifier with the first virtual machine. The processor may report the first identifier to the first virtual machine. The processor may further execute a second virtual machine on the core and receive a second request for an identification of the core by the second virtual machine. The processor may generate a second identifier associated with the core that may be different from the first identifier. The processor may associate the second identifier with the second virtual machine and report the second identifier to the second virtual machine.

Figure 1:
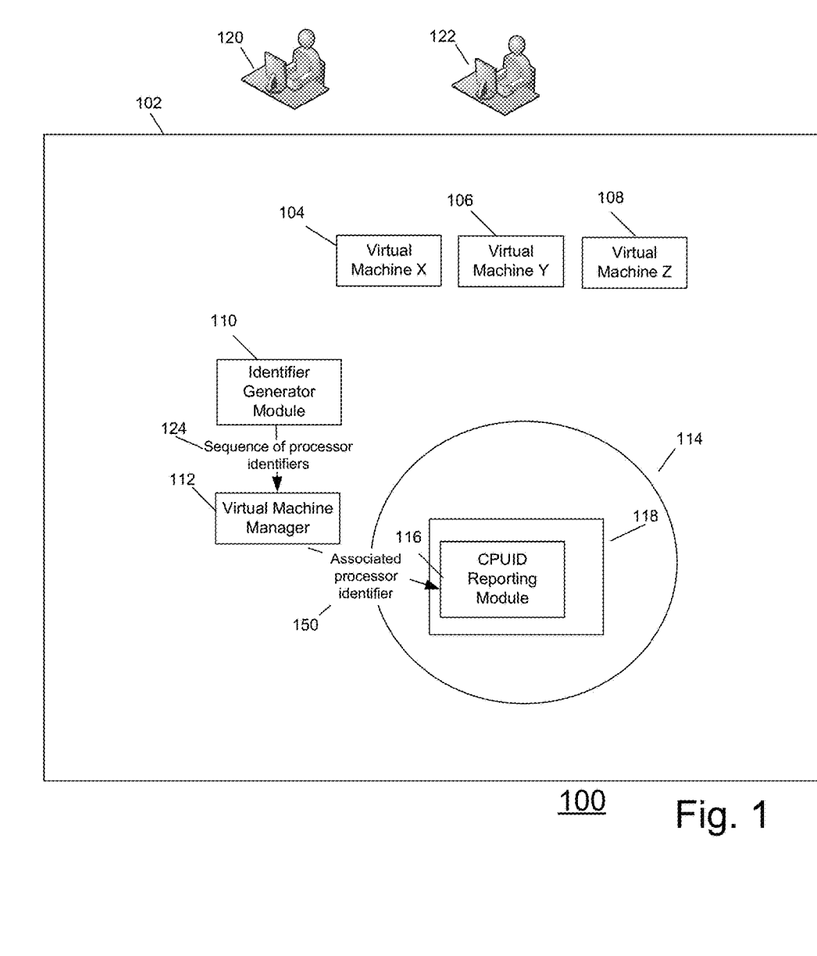
FIG. 1 illustrates an example system that can be utilized to implement processor identification for virtual machines.

FIG. 1 illustrates an example system 100 that can be utilized to implement processor identification for virtual machines, arranged in accordance with at least some embodiments described herein. Example system 100 may include a processor 102. Processor 102 may include one or more cores 114. Core 114 may execute one or more virtual machines 104, 106 and/or 108. A virtual machine may be, for example, a software instantiation of a computing environment. Virtual machines may be based on specifications of a hypothetical computing environment or emulate computer architecture and functions of a physical computer. In one example, virtual machines 104 and 106 may be associated with a first user 120 and virtual machine 108 may be associated with a second user 122.

Processor 102 may include one or more virtual machine managers 112. Virtual machine manager 112 may be, for example, hardware, software, or some combination of hardware and software and may be used to instantiate and/or execute virtual machines 104, 106, 108 by core 114. In examples where virtual machine manager 112 is implemented in software, core 114 may execute virtual machine manager 112. Processor 102 may include virtualization hardware 118. Virtualization hardware 118 may be hardware inside or outside of core 114 and may monitor instructions requested to be executed by virtual machines 104, 106, 108. Virtualization hardware 118 may receive and trap certain instructions requested to be executed by virtual machines 104, 106, 108. Virtualization hardware 118 may be, for example, INTEL's VT-X virtualization technology.

Virtualization hardware 118 may include a CPUID (central processing unit identification) reporting module 116. CPUID reporting module 116 may be configured to store an identifier that identifies processor 114. Virtual machine manager 112 may be configured to store identifiers in CPUID reporting module 116 that are also associated with a particular virtual machine. For example, virtualization hardware 118 may receive and trap a "CPUID" command issued by a virtual machine. Virtualization hardware 118 may process the CPUID command and return the identifier stored in CPUID reporting module 116 by virtual machine manager 112.

As described in more detail below, an identifier generator module 110 may be configured to generate a sequence of processor identifiers 124. Each processor identifier 124 may correspond to a combination of a virtual machine and a core that executes the virtual machine. Virtual machine manager 112 may implement identifier generator module 110. Virtual machine manager 112 may associate processor identifiers with virtual machines and may store associated processor identifiers 150 in CPUID reporting module 116. For example, identifier generator module 110 may generate a first processor identifier 124 associated with core 114. Virtual machine manager 112 may associate the first processor identifier with virtual machine X 104 executing on core 114. Identifier generator module 110 may thereafter generate a second processor identifier 124 associated with core 114. Virtual machine manager 112 may associate the second processor identifier with virtual machine Y 106 executing on core 114. Identifier generator module 110 may generate a third processor identifier 124 associated with core 114. Virtual machine manager 112 may associate the third processor identifier with virtual machine Z 108 executing on core 114. Virtual machine manager 112 may store respective values of processor identifiers 124 in CPUID reporting module 116.

As each virtual machine may be associated with a processor identifier that corresponds to the respective virtual machine being executed on a core, virtualization hardware 118 may return values stored in CPUID reporting module 116 that may be specific for each virtual machine. Users 120, 122 of virtual machines 104, 106, 108 may then receive reports that may assist users 120, 122 in generating analytics that relate to core 114 without having specific knowledge of the hardware in core 114.

Figure 2:
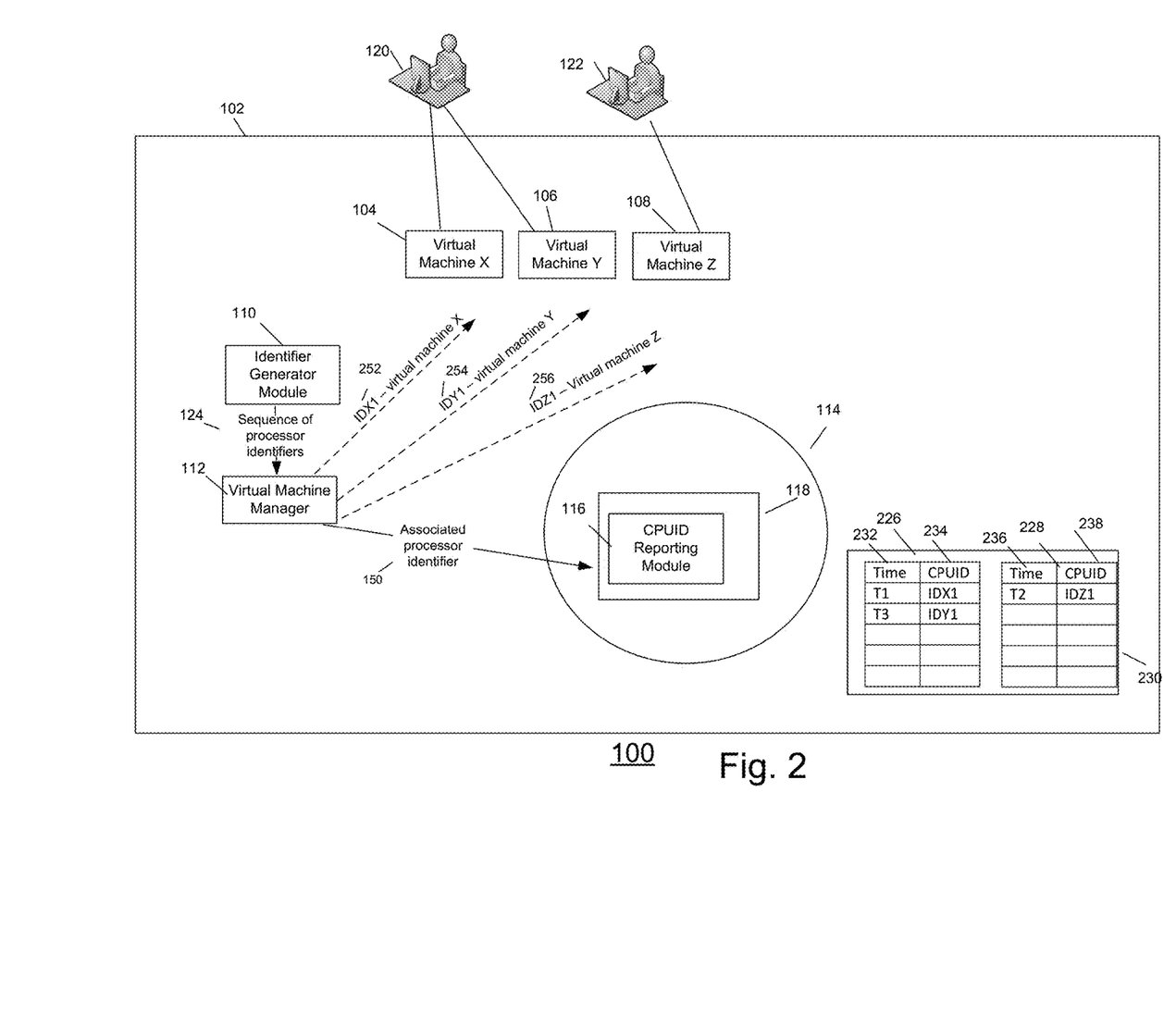
FIG. 2 illustrates the example system of FIG. 1 with additional details relating to association of identifiers with virtual machines.

FIG. 2 illustrates example system 100 of FIG. 1 with additional details relating to association of identifiers with virtual machines, arranged in accordance with at least some embodiments described herein. Those components in FIG. 2 that are labeled identically to components of FIG. 1 will not be described again for the purposes of clarity and brevity.

As shown in the example, virtual machine manager 112 may receive processor identifier 124 associated with core 114 and associate processor identifier 124 with a virtual machine. In the example, a first processor identifier 124 may be associated with virtual machine X 104—as shown with "IDX1" at 252. A second processor identifier may be associated with virtual machine Y 106—as shown with "IDY1" at 254. A third processor identifier 124 may be associated with virtual machine Z 108—as shown with "IDZ1" at 256.

As virtual machines are swapped into core 114 for execution, virtual machine manager 112 may store the associated processor identifier 150. For example, when virtual machine X 104 is swapped into core 114, virtual machine manager 112 may store associated processor identifier 150 corresponding to IDX1 in CPUID reporting module 116. In examples where virtual machine X 104 issues a "CPUID" command, virtualization hardware 118 may analyze CPUID reporting module 116 and report the value corresponding to IDX1 to virtual machine X 104 and to user 120. User 120 may then associate IDX1 with other information relating to operation of virtual machine X 104. For example, user 120 may associate IDX1 with other information that may be received in log files from virtual machine manager 112. However, user 120 may not be able to determine the specific hardware being used to execute virtual machine in core 114. Virtual machine manager 112 may determine whether the same or different users or entities are operating two or more virtual machines.

In some examples, two different processor identifiers may be associated with two different virtual machines operated by the same user or entity—as illustrated by processor identifier IDX1 and IDY1 being associated with two virtual machines operated by user 120. In other examples, one user or entity may receive the same processor identifier for all virtual machines being operated by the same user. In examples where multiple different processor identifiers are reported over time, users may collect together processor identifiers and retrospectively analyze operations of virtual machines on core 114. In some examples, virtual machine manager 112 may determine that a virtual machine was executed a first time by core 114 and then a second time by core 114 within a time interval. If the time interval is greater than a time interval defined by a schedule, virtual machine manager 112 may associate a new processor identifier 150 to the same virtual machine.

Virtualization hardware 118 may also use values in CPUID reporting module 116 to generate lists 226, 228. Lists 226, 228 may be stored in a memory 230 either in processor 102 or outside of processor 102. List 226 may include a time field 232 and/or a CPUID field 234. List 228 may include a time field 236 and/or a CPUID field 238. Lists 226, 228 may be generated for each user 120, 122 and may be sorted by hardware—such as sorted by core 114. In the example, user 120 is associated with virtual machine X 104 and virtual machine Y 106. List 226 may correspond to user 120 and may indicate time intervals when a respective virtual machine was executed by a core. Lists 226, 228 may be made available to users 120, 122 such as through the use of an application programming interface ("API"). An entity operating virtual machine manager 112 and/or processor 102 may associate processor identifiers with real hardware identifiers. In examples where users 120, 122 provide analytics information relating to processor identifiers to an entity operating processor 102, such as information in lists 226, 228, the entity operating processor 102 may be able to perform intelligent troubleshooting.

In the example, at time T1, core 114 executed virtual machine X 104. List 226 may identify time T1 and CPUID—IDX1—corresponding to core 114 and virtual machine X 104. At time T2, core 114 executed virtual machine Z 108. List 228 may identify time T2 and CPUID—IDZ1—corresponding to core 114 and virtual machine Z 108. At time T3, core 114 executed virtual machine Y 106. List 226 may identify time T3 and CPUID—IDY1—corresponding to core 114 and virtual machine Y 106. List 226 relates to virtual machines operated by user 120 and may be provided to user 120. Similarly, list 228 relates to virtual machines operated by user 122 and may be provided to user 122. Users 120, 122 may use lists 226, 228 to perform analysis on execution of virtual machines on core 114—without necessarily identifying core 114. Users 120, 122 may then associate data in lists 226, 228 with events that may have occurred while core 114 was executing virtual machines. Some of the time intervals T1, T2, T3 may overlap.

Users 120 and 122 may receive different lists and may not be able to relate entries on the different lists because different processor identifiers 124 may correspond to the same core 114. Processor identifier 124 may not be used to determine information about core 114 even if lists 226, 228 are provided with a true hardware identifier that identifies core 114.

In an example, user 120 may associate identifier IDX1 with other log entries relating to cores that execute virtual machine X 104. For example, user 120 may receive identifier IDX1 at time T1 and identifier IDX2 at time T2. An entity operating processor 102 may thereafter indicate that identifiers IDX1 and IDX2 both correspond to the same piece of hardware. User 120 may then associate information learned relating to identifier IDX1 with information relating to identifier IDX2. User 120 may then provide both identifiers IDX1 and IDX2, and/or an identification of the actual hardware, to an entity operating processor 102 for use in troubleshooting.

Figure 3:
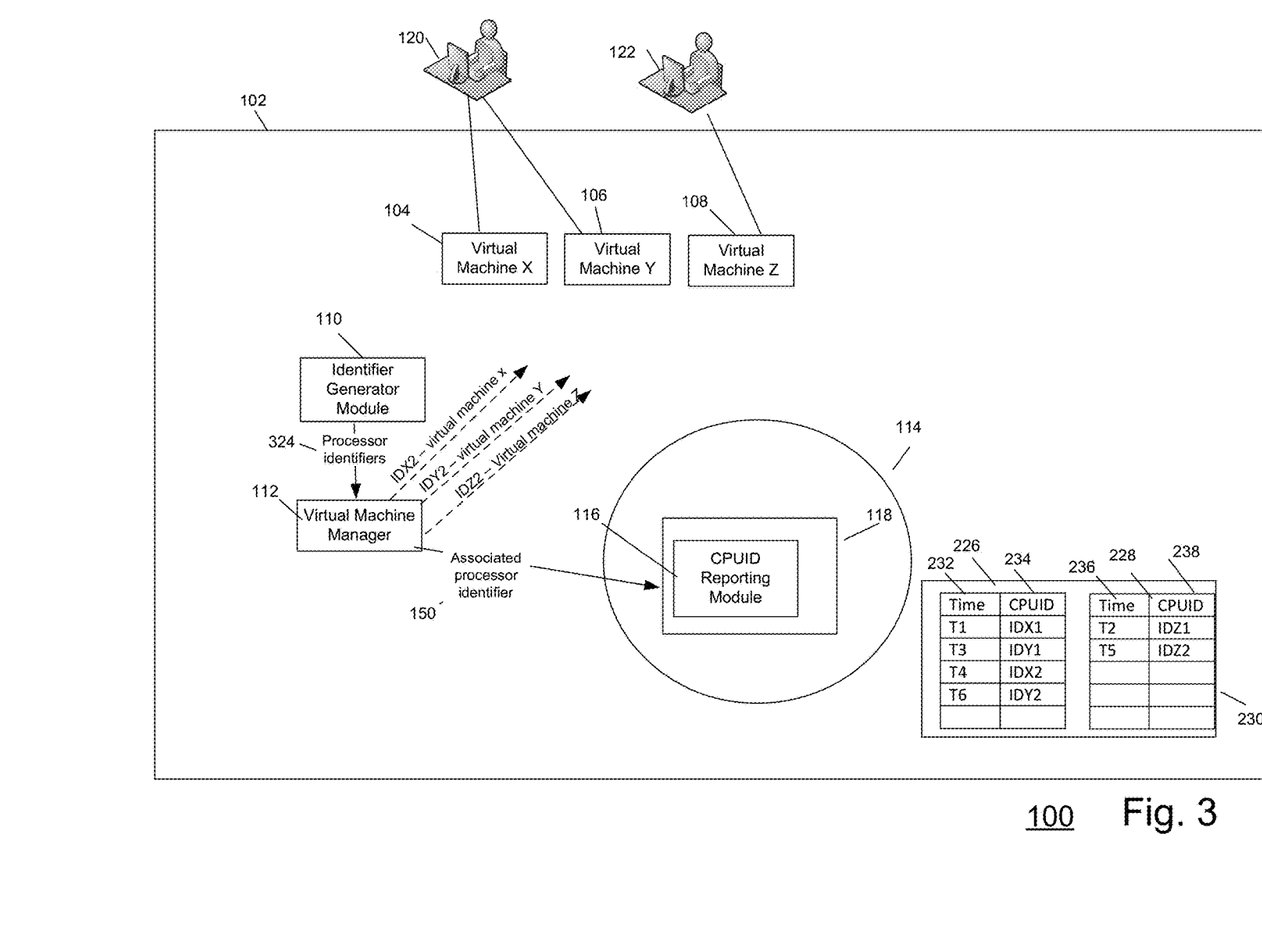
FIG. 3 depicts the example system of FIG. 2 with additional details relating to lists that may be generated.

FIG. 3 depicts example system 100 of FIG. 2 with additional details relating to lists that may be generated, arranged in accordance with at least some embodiments described herein. Those components in FIG. 3 that are labeled identically to components of FIGS. 1 and 2 will not be described again for the purposes of clarity and brevity.

Virtual machine manager 112 may associate different processor identifiers 124 with virtual machines at different times. For example, as was shown in the example in FIG. 2, at a first time, processor identifier "IDX1" is associated with virtual machine X—as is delineated the number "1". Identifier generator module 110 may generate different processor identifiers that may be associated with virtual machines at different or overlapping times. In FIG. 3, identifier generator module 110 is shown generating processor identifiers 324 for a different time. Virtual machine manager 112 may associate a new processor identifier to a virtual machine based on a schedule. For example, virtual machine manager 112 may associate a new processor identifier to a virtual machine every 5 minutes, or hour, or once a day, etc. Virtual machine manager 112 may associate a different processor identifier to virtual machines each time a virtual machine is loaded and executed by core 114.

As shown in the example, virtual machine manager 112 may receive processor identifiers 324 and associate processor identifier 324 to virtual machines. In the example, a first processor identifier may be associated with virtual machine X 104 being executed at a first time—as shown with "IDX1". At a second time, processor identifier "IDX2" may be associated with virtual machine X—as is delineated the number "2". At the second time, a processor identifier may be associated with virtual machine Y 106—as shown with "IDY2". A processor identifier 124 may be associated with virtual machine Z 108—as shown with "IDZ2".

In some examples, virtual machine manager 112 may append operational information to processor identifiers 324 before associating a processor identifier with a virtual machine. For example, virtual machine manager 112 may append information in bits to reflect states of a core 114, like power throttling, network congestion, mutex or semaphore contention, hardware error events, input/output queue or overfilling, etc. An identifier associated with a virtual machine may then indicate that the virtual machine was, for example, throttling power during a time when the identifier was associated with the virtual machine. Other information may be appended to the processor identifier that may be specific to a user or to a virtual machine. Equipment used, such as network equipment, may be identified in a processor identifier.

Among other possible benefits, a system in accordance with the disclosure may allow a user of a virtual machine to learn information about a processor executing the virtual machine without identifying specific hardware. Users of virtual machines and data centers may be able to generate analytics relating to performance of virtual machines on specific cores. Intermittent errors may be analyzed. Useful hardware information may be provided without revealing information that may be used for attacks. Two different virtual machines may receive two different identifiers. Even the same virtual machine may see different identifiers if executed at different times.

Certain types of malicious attacks may be avoided. For example, in a side channel attack, a second virtual machine sharing hardware with a first virtual machine may attempt to extract data from the first virtual machine. As users may not be aware of the current hardware executing virtual machines, users may have difficulty performing such side channel attacks. Malicious users may have difficulty determining whether their virtual machines are on the same hardware as a target virtual machine. Real information regarding hardware may be provided after execution by virtual machines but current hardware would not be known. Even if a malicious user obtained access to a core in an attempt to attack a particular virtual machine, the processor identifier that may be associated to the malicious user may be different than that of the particular virtual machine. As processor identifiers may change over time, a user may not be able to determine to which processors the user's virtual machines are associated.

Figure 4:
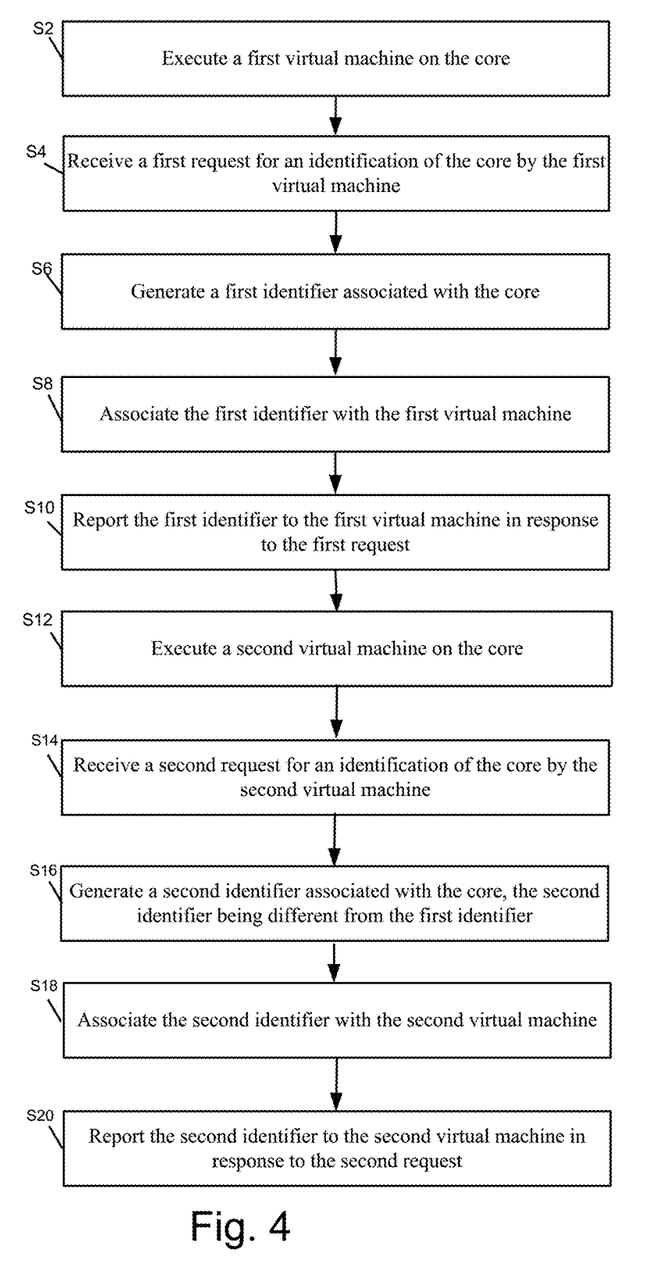
FIG. 4 depicts a flow diagram for an example process for implementing processor identification for virtual machines.

FIG. 4 depicts a flow diagram for example processes for implementing processor identification for virtual machines, arranged in accordance with at least some embodiments described herein. In some examples, the process in FIG. 4 could be implemented using system 100 discussed above. An example process may include one or more operations, actions, or functions as illustrated by one or more of blocks S2, S4, S6, S8, S10, S12, S14, S16, S18 and/or S20. Although illustrated as discrete blocks, various blocks may be divided into additional blocks, combined into fewer blocks, or eliminated, depending on the desired implementation. The process in FIG. 4 may be used to execute virtual machines on a core.

Processing may begin at block S2, "Execute a first virtual machine on the core." At block S2, a processor may execute a first virtual machine on a core.

Processing may continue from block S2 to block S4, "Receive a first request for an identification of the core by the first virtual machine." At block S4, the core may receive a first request for an identification of the core by the first virtual machine. A virtualization hardware may process the first request.

Processing may continue from block S4 to block S6, "Generate a first identifier associated with the core." At block S6, the processor may generate a first identifier associated with the core.

Processing may continue from block S6 to block S8, "Associate the first identifier with the first virtual machine." At block S8, the processor may associate the first identifier with the first virtual machine.

Processing may continue from block S8 to block S10, "Report the first identifier to the first virtual machine in response to the first request." At block S10, the virtualization hardware may report the first identifier to the first virtual machine. In some examples, the first identifier may include operational information that relates to the core.

Processing may continue from block S10 to block S12, "Execute a second virtual machine on the core." At block S12, the processor may execute a second virtual machine on the core.

Processing may continue from block S12 to block S14, "Receive a second request for an identification of the core by the second virtual machine." At block S14, the core may receive a second request for an identification of the core by the second virtual machine. The virtualization hardware may process the second request.

Processing may continue from block S14 to block S16, "Generate a second identifier associated with the core, the second identifier being different from the first identifier." At block S16, the processor may generate a second identifier associated with the core. The second identifier may be different from the first identifier. In some examples, if two virtual machines are operated by the same entity, the two virtual machines may be associated with the same identifier. In other examples, if two virtual machines are operated by the same entity, the two virtual machines may be associated with different identifiers.

Processing may continue from block S16 to block S18, "Associate the second identifier with the second virtual machine." At block S18, the processor may associate the second identifier with the second virtual machine. In some examples, the first virtual machine may be associated a different identifier if a time interval beyond a threshold has passed since the last time the first virtual machine was executed. The first and second identifiers may be stored in a CPUID module and the requests may be CPUID commands.

Processing may continue from block S18 to block S20, "Report the second identifier to the second virtual machine in response to the second request." At block S20, the virtualization hardware may report the second identifier to the second virtual machine. The virtualization hardware may report the first and second identifiers. In some examples, lists may be generated that include the identifiers of the virtual machines.

Figure 5:
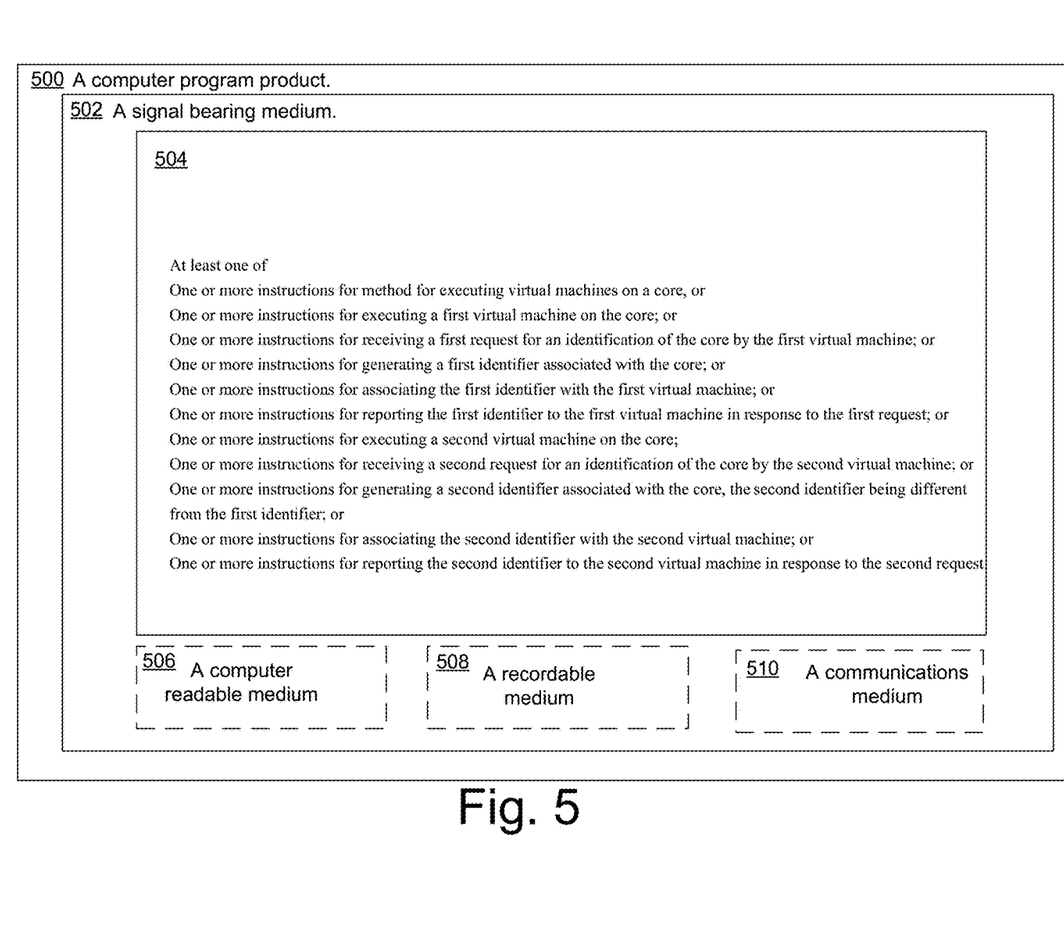
FIG. 5 illustrates an example computer program product that can be utilized to implement processor identification for virtual machines.

FIG. 5 illustrates a computer program product 500 that can be utilized to implement processor identification for virtual machines arranged in accordance with at least some embodiments presented herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, processor 102 may undertake one or more of the blocks shown in FIG. 5 in response to instructions 504 conveyed to the systems 100 or 200 by signal bearing medium 502.

In some implementations, signal bearing medium 502 may encompass a computer-readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the systems 100 or 200 by an RF signal bearing medium 502, where the signal bearing medium 502 is conveyed by a wireless communications medium 510 (e.g., a wireless communications medium conforming with the IEEE 802.11 standard).

Figure 6:
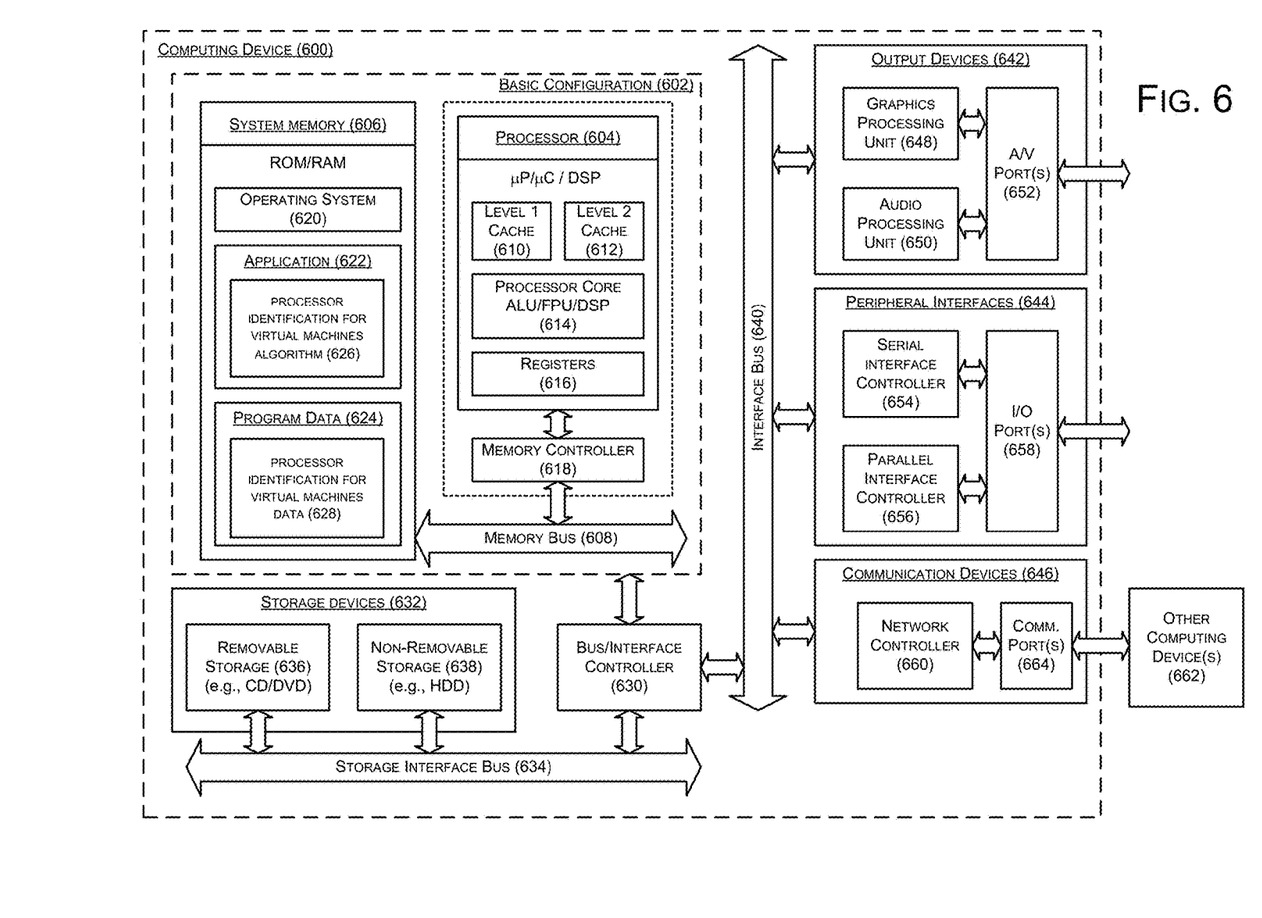
FIG. 6 is a block diagram illustrating an example computing device that is arranged to implement processor identification for virtual machines, all arranged according to at least some embodiments described herein.

FIG. 6 is a block diagram illustrating an example computing device 600 that is arranged to implement processor identification for virtual machines arranged in accordance with at least some embodiments presented herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include a processor identification for virtual machines algorithm 626 that is arranged to perform the functions as described herein including those described previously with respect to FIGS. 1-5. Program data 624 may include processor identification for virtual machines data 628 that may be useful for implementing processor identification for virtual machines as is described herein. In some embodiments, application 622 may be arranged to operate with program data 624 on operating system 620 such that processor identification for virtual machines may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to execute virtual machines on a particular core from among a plurality of cores of a processor, the method comprising:
   executing a first virtual machine on the particular core at a first time;
   generating, by the processor, a first identifier associated with the particular core;
   associating the first identifier with the first virtual machine;
   reporting the first identifier to the first virtual machine in response to a first request from the first virtual machine for identification of the particular core, wherein the first identifier identifies the particular core from among the plurality of cores;
   executing a second virtual machine on the particular core;
   generating, by the processor, a second identifier associated with the particular core, wherein the second identifier is different from the first identifier;
   associating the second identifier with the second virtual machine;
   reporting the second identifier to the second virtual machine in response to a second request from the second virtual machine for identification of the particular core, wherein the second identifier identifies the particular core from among the plurality of cores;
   executing the first virtual machine on the particular core at a second time;
   determining that a first time interval between the first time and the second time is greater than a second time interval defined by a schedule;
   in response to the determination that the first time interval is greater than the second time interval, generating, by the processor, a third identifier associated with the particular core, wherein the third identifier is different from the first identifier and is different from the second identifier;
   associating the third identifier with the first virtual machine; and
   reporting the third identifier to the first virtual machine in response to a third request from the first virtual machine for identification of the particular core, wherein the third identifier identifies the particular core from among the plurality of cores.

2. The method of claim 1, further comprising:
   determining that the first virtual machine is operated by an entity;
   executing a third virtual machine on the particular core;
   determining that the third virtual machine is operated by the entity;
   associating the first identifier with the third virtual machine; and
   reporting the first identifier to the third virtual machine in response to a fourth request from the third virtual machine for identification of the particular core.

3. The method of claim 1, further comprising:
   determining that the first virtual machine is operated by an entity;
   executing a third virtual machine on the particular core;
   determining that the third virtual machine is operated by the entity;

generating, by the processor, a fourth identifier associated with the particular core, wherein the fourth identifier is different from the first identifier and is different from the second identifier;

associating the fourth identifier with the third virtual machine; and reporting the fourth identifier to the third virtual machine in response to a fourth request from the third virtual machine for identification of the particular core, wherein the fourth identifier identifies the particular core from among the plurality of cores.

4. The method of claim 1, further comprising:
storing the first identifier and the second identifier in a central processing unit identification (CPUID) module, wherein reporting the first identifier and the second identifier includes returning the first identifier and the second identifier with use of a virtualization hardware.

5. The method of claim 1, wherein the first request and the second request include central processing unit identification (CPUID) commands.

6. The method of claim 1, further comprising:
generating a first list that includes an identification of the first virtual machine and the first identifier;
sending the first list to the first virtual machine;
generating a second list that includes an identification of the second virtual machine and the second identifier; and
sending the second list to the second virtual machine.

7. The method of claim 1, wherein the first identifier includes operational information that relates to the particular core.

8. A system configured to execute virtual machines on a particular core from among a plurality of cores of a processor, the system comprising:
a memory that includes instructions; and
the processor, wherein the processor is configured to be in communication with the memory, and wherein the processor is further configured to, in accordance with the instructions:
execute a first virtual machine on the particular core at a first time;
generate a first identifier associated with the particular core;
associate the first identifier with the first virtual machine;
report the first identifier to the first virtual machine in response to a first request from the first virtual machine for identification of the particular core, wherein the first identifier identifies the particular core from among the plurality of cores;
execute a second virtual machine on the particular core;
generate a second identifier associated with the particular core, wherein the second identifier is different from the first identifier;
associate the second identifier with the second virtual machine;
report the second identifier to the second virtual machine in response to a second request from the second virtual machine for identification of the particular core, wherein the second identifier identifies the particular core from among the plurality of cores;
execute the first virtual machine on the particular core at a second time;
determine that a first time interval between the first time and the second time is greater than a second time interval defined by a schedule;

in response to the determination that the first time interval is greater than the second time interval, generate a third identifier associated with the particular core, wherein the third identifier is different from the first identifier and is different from the second identifier;
associate the third identifier with the first virtual machine; and
report the third identifier to the first virtual machine in response to a third request from the first virtual machine for identification of the particular core, wherein the third identifier identifies the particular core from among the plurality of cores.

9. The system of claim 8, wherein the processor is further configured to:
determine that the first virtual machine is operated by an entity;
execute a third virtual machine on the particular core;
determine that the third virtual machine is operated by the entity;
associate the first identifier with the third virtual machine; and
report the first identifier to the third virtual machine in response to a fourth request from the third virtual machine for identification of the particular core.

10. The system of claim 8, wherein the processor is further configured to:
determine that the first virtual machine is operated by an entity;
execute a third virtual machine on the particular core;
determine that the third virtual machine is operated by the entity;
generate a fourth identifier associated with the particular core, wherein the fourth identifier is different from the first identifier and is different from the second identifier;
associate the fourth identifier with the third virtual machine; and
report the fourth identifier to the third virtual machine in response to a third request from the third virtual machine for identification of the particular core, wherein the fourth identifier identifies the particular core from among the plurality of cores.

11. The system of claim 8, further comprising:
a central processing unit identification (CPUID) module; and
a virtualization hardware, wherein:
the processor is further configured to store the first identifier and the second identifier in the CPUID module, and
the virtualization hardware is configured to return the first identifier and the second identifier.

12. The system of claim 8, wherein the first request and the second request include central processing unit identification (CPUID) commands.

13. The system of claim 8, wherein the processor is further configured to:
generate a first list that includes an identification of the first virtual machine and the first identifier;
send the first list to the first virtual machine;
generate a second list that includes an identification of the second virtual machine and the second identifier; and
send the second list to the second virtual machine.

14. The system of claim 8, wherein the first identifier includes operational information that relates to the particular core.

15. A method to execute a virtual machine on a particular core from among a plurality of cores of a processor, the method comprising:
- executing the virtual machine on the particular core;
- sending, by the virtual machine executed on the particular core, a first request for identification of the particular core at a first time;
- generating, by the processor, a first identifier associated with the particular core;
- associating the first identifier with the virtual machine;
- reporting the first identifier to the virtual machine, in response to the first request sent by the virtual machine for identification of the particular core;
- receiving, by the virtual machine, the first identifier associated with the particular core, wherein the first identifier identifies the particular core from among the plurality of cores;
- sending, by the virtual machine, a second request for identification of the particular core at a second time;
- determining whether a first time interval between the first time and the second time is greater than a second time interval defined by a schedule;
- in response to a determination that the first time interval is greater than the second time interval, generating, by the processor, a second identifier associated with the particular core;
- associating the second identifier with the virtual machine;
- reporting the second identifier to the virtual machine, in response to the second request sent by the virtual machine for identification of the particular core; and
- receiving, by the virtual machine, the second identifier associated with the particular core, wherein the second identifier is different from the first identifier.

16. The method of claim 15, wherein the virtual machine includes a first virtual machine and the method further comprises:
- sending, by a second virtual machine executed on the particular core, a third request for identification of the particular core;
- receiving, by the second virtual machine and in response to the third request, a third identifier associated with the particular core, wherein the third identifier is different from the second identifier and is different from the first identifier, and wherein the third identifier identifies the particular core from among the plurality of cores.

17. The method of claim 15, wherein sending the first request and the second request include sending central processing unit identification (CPUID) commands.

18. The method of claim 16, wherein receiving the first identifier and the second identifier includes receiving a first list that includes an identification of the first virtual machine, the first identifier, and the second identifier.

19. The method of claim 15, wherein receiving the first identifier includes receiving operational information that relates to the particular core.

* * * * *

UNITED STATES PATENT AND TRADEMARK OFFICE
CERTIFICATE OF CORRECTION

| | | |
|---|---|---|
| PATENT NO. | : 9,760,390 B2 | Page 1 of 1 |
| APPLICATION NO. | : 14/351070 | |
| DATED | : September 12, 2017 | |
| INVENTOR(S) | : Kruglick | |

It is certified that error appears in the above-identified patent and that said Letters Patent is hereby corrected as shown below:

In the Specification

In Column 1, Line 5, delete "APPLICATIONS APPLICATION" and insert -- APPLICATION --, therefor.

In the Claims

In Column 15, Line 7, in Claim 15, delete "time:" and insert -- time; --, therefor.

Signed and Sealed this
Eighth Day of May, 2018

Andrei Iancu
*Director of the United States Patent and Trademark Office*